Oct. 2, 1956 J. D. REPKO 2,765,431
VARIABLE CAPACITOR
Filed June 12, 1952
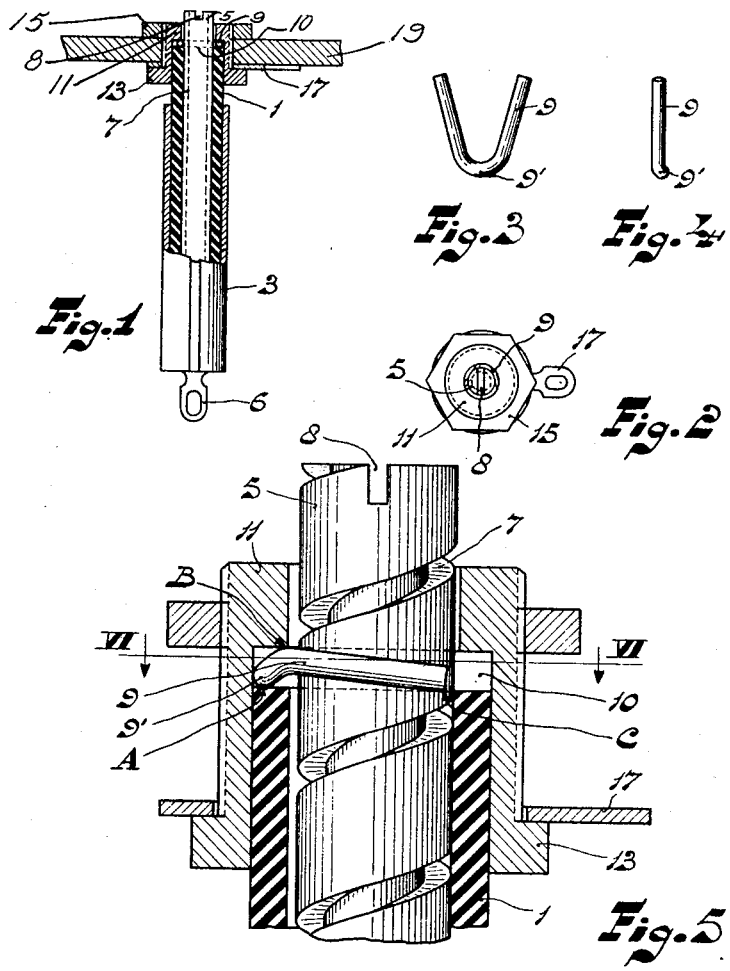
INVENTOR
Jan Dirk Repko
BY Fred M. Vogel
AGENT United States Patent Office 2,765,431
Patented Oct. 2, 1956

2,765,431

VARIABLE CAPACITOR

Jan Dirk Repko, Eindhoven, Netherlands, assignor to Hartford National Bank and Trust Company, Hartford, Conn., as trustee Application June 12, 1952, Serial No. 293,053

Claims priority, application Netherlands June 21, 1951

3 Claims. (Cl. 317—249)

This invention relates to variable capacitors, more particularly to trimming capacitors comprising a tubular dielectric, for example, of ceramic material, in which a suitable, screw-threaded inner electrode is provided. The main advantage of these constructions resides in the small space occupied by the capacitor mounted on a chassis plate.

One of the greatest difficulties in the design of such capacitors is formed by the plate-free course of the inner electrode. With a known construction one of the ends of the dielectric tube is held in a metal sleeve, which serves to mount the unit and forms the nut to the screw-threaded part of the inner electrode. For this purpose the sleeve is provided with inner screw-thread and with a transverse slot extenting down to this screw-thread and comprising a clamping spring. The latter serves to avoid play of the inner electrode with respect to the sleeve.

These nut constructions, which are frequently used (see for example French patent specification No. 899,967, British patent specifications Nos. 648,228 and 600,033) is comparatively costly in the case of mass production of very great numbers. A simpler and cheaper construction could be obtained by using the clamping spring itself as an inner screw-thread (nut), so that the inner screw-thread of the mounting sleeve could be dispensed with. In this case, it is very difficult to avoid axial play, since the clamping spring must be accommodated in the transverse slot of the mounting sleeve with a certain amount of axial play in order to ensure that the motion of the spring in the direction of clamping is not hindered. In the manner described in French patent specification No. 860,881 the steel wire spring forming the nut may, as an alternative, be clamped tight at the ends. With the known devices, however, the space required for the nut construction is comparatively large and, moreover, the spring is comparatively slack, so that axial play of the inner electrode may nevertheless occur.

The invention has for its object to minimize these difficulties and to provide a cheap construction of small transverse dimensions, suitable for mass production. According to the invention, this is achieved by forming the wire spring constituting the nut substantially in the shape of a V, the wire being bent out of the plane of the V through an angle of less than 90° at least one of the three points of the V and by enclosing the spring without play in a chamber formed between one of the front surfaces of the dielectric tube and a cap secured thereto, allowing the screw electrode to pass, in a manner such that the part of the spring adjoining the inner electrode keeps clear from the walls of the chamber.

In order that the invention may be readily carried into effect, an example will now be described in detail with reference to the accompanying drawings, of which Fig. 1 is an axial sectional view (part of the embodiment is shown in a view);

Fig. 2 is a plan view;

Figs. 3 and 4 are two views of a component part and Figs. 5 and 6 are a longitudinal and a transverse sectional view on the tenfold scale.

The trimming capacitor shown in Figs. 1 and 2 on a scale of 2:1 comprises primarily a tube 1 of ceramic material, which constitutes the dielectric, a stationary outer electrode 3 (shown in part in a view) and an adjustable inner electrode 5. The outer electrode 3 is made of brass plate, which is wound to form a tube having an axial slot, surrounding the tube 1 in a resilient manner.

A tag-shaped prolongation of the electrode 3 constitutes a soldering tag 6.

The inner electrode is a brass rod having a circular sectional area which fits in the tube 1 with a small intermediate space and which is provided with a single screw-thread and a screw slot 8 (see also Fig. 5). The surface between the turns of the screw-thread, which is the largest part of the total surface of the rod, as is shown in the drawing, is cylindrical, so that the clearance space filled with air between the electrode 5 and the ceramic tube 3 is comparatively small, so that the advantageous dielectric properties of the latter are utilized to a maximum. As an "inner screw-thread" or nut serves a V-shaped spring 9 of steel wire or Phosphor bronze wire, of which one limb is engaged in the screw-thread and housed in a circular chamber 10, which is formed between one of the end surfaces of the tube 1 and a metal cap 11, which is shrunk onto the tube and the bottom of which is provided with a central aperture to allow the rod 5 to pass. The cap 11 has a hexagonal flange 13 and is provided with outer screw-thread, on which a nut 15 is screwed. With the use thereof the capacitor together with an intermediate washer having a soldering tag 17 may be secured to a chassis plate 19.

The Figs. 3 and 4 show the V-shaped spring in two views on a scale 5:1. Fig. 4 shows that the point 9' of the V where the two limbs join is bent out of the plane of the V through an angle of about 45° (as is shown in Fig. 3 this "point" is rounded; the designation is based only on a comparison with the character V).

The manner in which the spring 9 is housed in the chamber 10 is illustrated in Figs. 5 and 6. On a scale 10:1 Fig. 5 shows the cap 11 in an axial sectional view, the electrode 5 and the spring 9 being shown in a view; Fig. 6 is a cross sectional view taken on the line VI—VI of Fig. 5, the spring 9 being shown also in a view.

The limbs of the spring 9, which is initially shaped in the form shown in Fig. 3, are slightly bent outwards, as is shown in Fig. 6, owing to the introduction of the electrode rod 5. One of the limbs, in this figure the upper limb, lies in the screw-thread 7 (see Fig. 5); the other bears on the cylindrical surface of the rod 5. The three points of the V-spring bear radially on the cylindrical wall of the chamber 10, the rod 5 being urged sideways against the inner wall of the tube 1, owing to the V-shape of the spring 9, so that radial play of the rod cannot occur.

The axial play is obviated by bending upwards the point 9' of the spring 9. From Fig. 5 it is evident that the spring bears in an axial direction at five points on the flat walls of the chamber 10. Three of these points are designated in the figure by A, B and C. The other two points bear on the limb not shown in Fig. 5 (behind the points B and C). Consequently, the spring 9 is housed in the chamber 10 so as to be free from play also in an axial direction. Fig. 5 furthermore shows that owing to the upward bending of the point 9' a further imperative requirement is fulfilled, that is to say that the part of the limb shown in Fig. 5 of the spring 9, bearing on the rod 5 in a resilient manner (the part BC) is completely free from the chamber 10, i. e. it does not touch the walls anywhere, so that it is not hindered in its resilient motion. The same applies to the limb of the spring not shown in Fig. 5. It is evident from Fig. 5 that only a small part of the spring 9 is not free; consequently, 80 to 90% of the spring is used to advantage. Thus, in spite of the small dimensions of the spring 9, which has a length of only a few millimetres, and of the chamber 10 it is ensured that the completely free parts of the spring extending on the left and on the right side beyond the rod 5 are, on the one hand, sufficiently long to guarantee a smooth spring effect, and, on the other hand, short enough to render the resilient motion of the rod 5 in an axial direction negligibly small. In this case the dimensions of the spring are so small that, although the spring is completely housed in the chamber 10, the outer dimensions of the cap 11 may be kept advantageously small. Since the spring does not protrude anywhere out of the chamber 10, the means provided on the cap for so-called one-hole-mounting, in this case outer screw-thread, flange 13 and nut 15, may extend without objection throughout the length of the cap, consequently also over the part inside which the spring 9 is located. The cap 11 need not be longer than the length required for these means, so that it is as short as possible.

The shape of the spring 9 described above provides the additional advantage that no special spacing means are required to fix the axial dimension of the chamber 10. This is done by the spring 9 itself. During manufacture, after the spring has been introduced into the cap 11, the tube 1 is pressed into the cap, which may be heated, until the tube touches the spring. Then the spring is fixed so as to be free from play, since it bears at the five said points (and since it bears in a radial direction at three points on the cylindrical wall of the chamber 10). As is evident from Fig. 5, it is essential that point B should be located between the points A and C, which means in practice that the point 9' must be bent upwards through an angle of not more than 90°. It may be observed here that instead of bending upwards the point 9', one of the other two points of the V, or both of them, may be bent upwards, as an alternative, although the first-mentioned arrangement yields the best results. Moreover, the spring 9 need not directly engage the head surface of the tube 1; between these two parts for example, a filling washer might be provided.

If desired, the spring 9 may be arranged in a reverse manner as compared to Fig. 5, i. e. the contact point B being at the bottom and the points A and C at the top. If the screw slot is provided in the manner shown at the top of the tube 5, the position shown is more favorable, since in this case the pressure of the screw driver, which is introduced into the slot 8 for adjustment, co-operates to keep the spring in the correct position. Consequently, it may be stated in general that the spring is preferably bent upwards on the side remote from the screw slot 8.

One of the ends of the wire spring 9 could be prolonged by an inoperative piece bent into the direction of the other end, so that the spring would be shaped in a form slightly differing from that of a V. It is essential, however, that the operative part of the spring should be primarily V-shaped.

As stated above, the outer electrode 3 is a sheath having an axial slot, surrounding the ceramic tube 1 in a resilient manner. This has the advantage that upon a variation in temperature, the outer electrode engages the ceramic tube 3 always with a minimum of clearance space, in spite of the differences in expansion coefficients.

Figs. 1 and 5 show that the cap 11 is of an extremely simple construction and may, consequently, be manufactured in series at low cost. The simple shape is obtained, since one of the walls of the spring chamber 10 is constituted by the dielectric tube 1. The spring chamber is formed so to say automatically when the tube 1 is secured in the cap 11. Consequently, a particular formation of this cap to constitute a spring chamber, which would, of course, increase the cost of this part, may be dispensed with.

The assembly of the capacitor is also very simple: the spring 9 is introduced into the cap 11 and the tube 1 is pressed into the cap. Then the electrode rod 5 can be screwed into the cap.

What I claim is:

1. A variable capacitor comprising a tubular dielectric, an outer electrode at least partially surrounding said tubular dielectric, a screw threaded inner electrode in said tubular dielectric, a metal cap secured to the outer surface of one end of said tubular dielectric, the bottom of said cap being axially spaced from said one end of said tubular dielectric to form an annular chamber surrounding said inner electrode, a V-shaped spring arranged in said chamber and engaging the turns of said screw threaded inner electrode near one end of the tubular dielectric, said spring having at least at one of the three points of the V bent out of the plane of the V through an angle of less than 90°, said one of the three points bent out of the plane of the V being in said annular chamber and engaging said one end of the tubular dielectric while adjacent parts of the V engage the bottom of said metal cap to thereby prevent axial play and rotation of said spring, and at least one other part of one of the legs of said spring yieldably engaging said inner electrode and positioned obliquely with respect to one end of said tubular dielectric, said part being free from the walls of said chamber.

2. A variable capacitor as set forth in claim 1 wherein the apex portion of said V-shaped spring is bent outwardly.

3. A variable capacitor as set forth in claim 1 wherein said inner electrode is provided with a cylindrical surface between the turns of the screw threads thereon.

References Cited in the file of this patent

UNITED STATES PATENTS

| | | |
|---|---|---|
| 2,253,978 | Meriwether | Aug. 26, 1941 |
| 2,455,875 | Peterson | Dec. 7, 1948 |
| 2,503,084 | White et al. | Apr. 4, 1950 |
| 2,516,981 | Hall | Aug. 1, 1950 |

FOREIGN PATENTS

| | | |
|---|---|---|
| 51,720 | Netherlands | Dec. 15, 1941 |
| 600,033 | Great Britain | Mar. 30, 1948 |
| 648,228 | Great Britain | Jan. 3, 1951 |